United States Patent [19]
Chacko

[11] 3,782,413
[45] Jan. 1, 1974

[54] TRIGGER MECHANISM FOR GAS VALVING APPARATUS

[75] Inventor: Joseph Chacko, San Francisco, Calif.

[73] Assignee: Sargent Industries, Inc., Los Angeles, Calif.

[22] Filed: June 12, 1972

[21] Appl. No.: 261,909

Related U.S. Application Data

[60] Division of Ser. No. 68,512, Aug. 31, 1970, which is a continuation of Ser. No. 801,640, Feb. 24, 1969, abandoned.

[52] U.S. Cl............................. 137/565, 251/74, 9/11
[51] Int. Cl............................................ F16k 31/524
[58] Field of Search.................. 137/60 A, 223, 227, 137/234, 565; 251/74; 222/3, 5; 74/2; 9/11 R, 11 A, 14, 319

[56] References Cited
UNITED STATES PATENTS

| | | | |
|---|---|---|---|
| 1,805,370 | 5/1931 | Meyer | 9/319 |
| 2,949,274 | 8/1960 | Heigis et al. | 74/2 X |
| 3,030,063 | 4/1962 | Seaberg et al. | 74/2 X |
| 3,150,388 | 9/1964 | Oliphant | 222/3 X |
| 3,165,763 | 1/1965 | Gaylord | 251/74 X |
| 3,237,806 | 3/1966 | Nelson et al. | 222/5 |

*Primary Examiner*—William R. Cline
*Attorney*—Smyth, Roston & Pavitt

[57] ABSTRACT

A triggering mechanism for a gas valving apparatus including a lever for displacing the valve poppet into its off position, an arming cam for applying force to the lever and a triggering cam for locking the lever in the poppet off position. The mechanism is armed by rotating the arming cam into poppet displacing engagement with the lever and then rotating the pull-cable actuated triggering cam into engagement with the lever to lock the poppet in the off position. Tension applied to the pull-cable releases the lever and allows the poppet to open.

12 Claims, 5 Drawing Figures

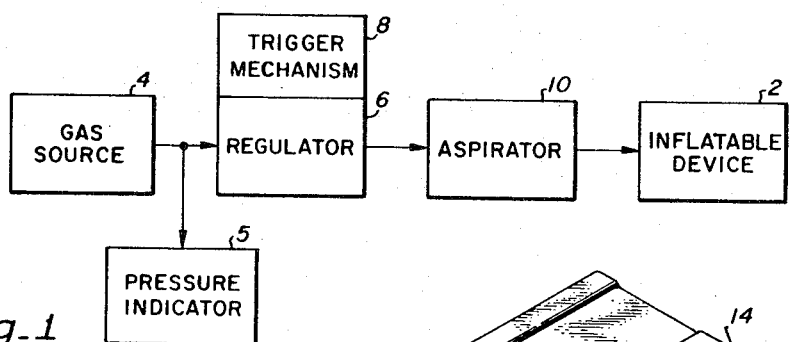
Fig_1
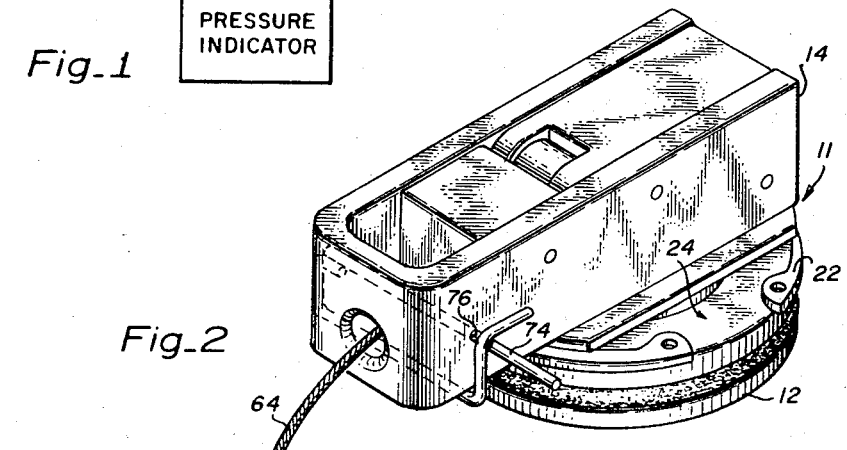
Fig_2
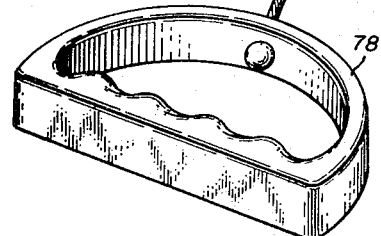
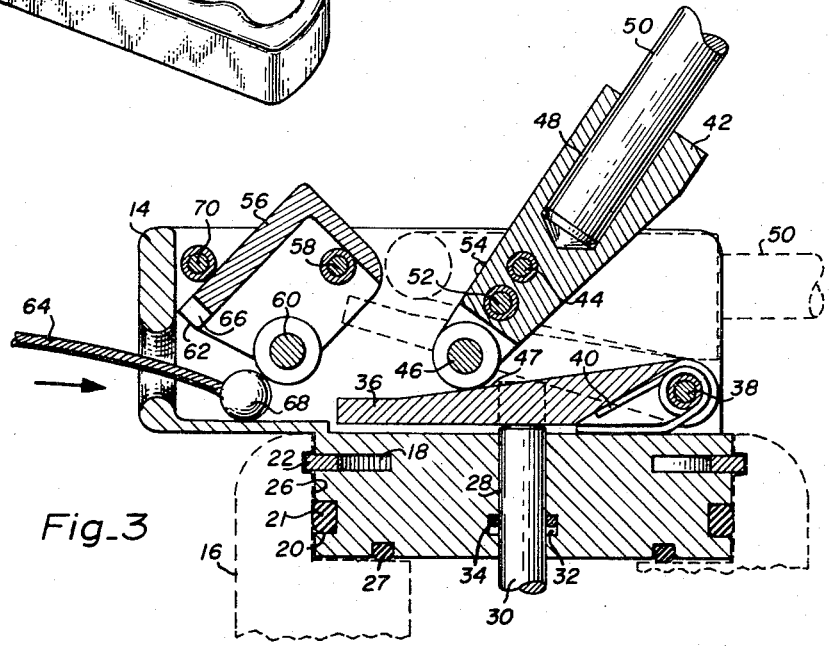
Fig_3

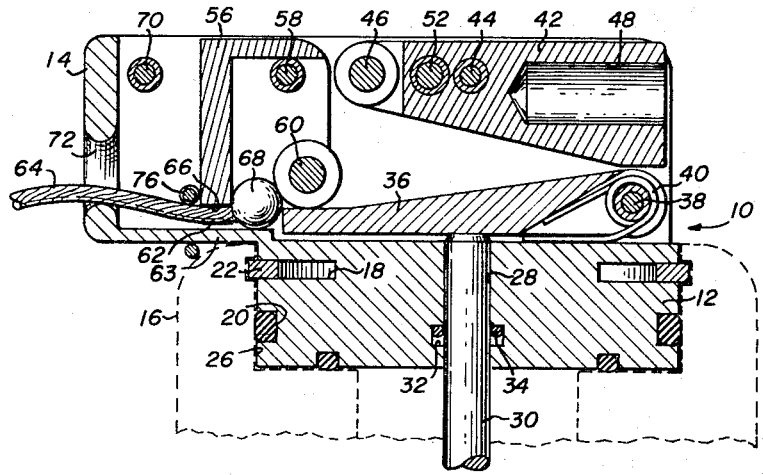
Fig_4
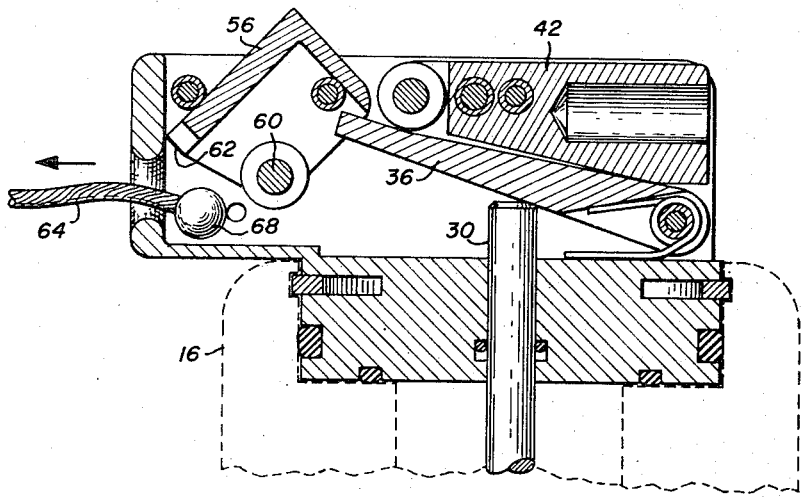
Fig_5

TRIGGER MECHANISM FOR GAS VALVING APPARATUS

This is a division of application Ser. No. 68,512, filed Aug. 31, 1970, which in turn was a continuation of application Ser. No. 801,640, filed Feb. 24, 1969 (now abandoned).

BACKGROUND OF THE INVENTION

This invention relates generally to a triggering apparatus and more particularly, to a means for rapidly opening the discharge valve of a high pressure gas container.

Gas from highly pressurized storage containers are widely used today for many different applications. Many of these applications involve one-shot operations wherein the exit orifice of the container is rapidly opened to allow all of the stored gas to be exhausted as rapidly as possible to perform a desired operation. As an example, such apparatus is used to inflate life rafts, escape chutes, etc., which form part of the safety equipment used on aircraft.

Heretofore the triggering devices used for such applications have varied from a simple turn-valve to various forms of triggering mechanisms which are fired in response to a tensile or compressive force applied thereto. Since the pressure of the gases stored within the pressurized containers are typically quite high, on the order of 3,000 pounds or more per square inch, the pressure required to open the exhaust valve means is usually substantial. However, where the device is used primarily for emergency use, such as in the example above, it is desirable that the actuating force required to trigger the filling operation be low, on the order of eight pounds or less, for example.

Furthermore, the triggering force should be applicable through a cable to which a hand grip or the like may be attached. In addition the triggering mechanism should be selectively positionable so that the direction of the triggering force is not limited to a signle orientation. Moreover, the triggering device should be easily armed so as not to require special tools and should be substantially foolproof from an arming and operational standpoint. Suitable triggering devices having these features have not heretofore been provided in the prior art for use with high pressure valving mechanisms.

OBJECTS OF THE PRESENT INVENTION

It is therefore a principal object of the present invention to provide a novel triggering device for the high pressure valving mechanism used in gas storage systems which is relatively foolproof in construction, is substantially maintenance free, and is actuated by a relatively small actuating force.

Another object of the present invention is to provide a novel triggering mechanism of the type described which can be easily armed and rearmed without the use of special tools.

Still another object of the present invention is to provide a novel triggering mechanism for high pressure gas containers which is simple in construction yet dependable in operation.

Still another object of the present invention is to provide a novel triggering mechanism for a high pressure gas container or the like which permits replacement of the actuating pull-cable after the tank is charged without loss of pressure therein.

Still another object of the present invention is to provide a pull-cable type triggering mechansim for high pressure gas containers, the pull direction of which can be changed at any time without actuation of the triggerable valve.

SUMMARY OF THE PRESENT INVENTION

The triggering mechansim of the present invention is basically comprised of a pivoted valve actuation lever for controlling the position of a valve poppet, an arming cam for depressing the actuation lever and a trigger cam for locking and releasing the actuation lever. By rotating the arming cam into the mechanism, the valve actuation lever is depressed so that the trigger cam with its release cable properly inserted therein can be rotated into its locking position to lock the actuation lever in the valve closed position. Once the mechanism has been so armed, it can be triggered by pulling on the release cable which rotates the trigger cam away from the actuation lever locking position. The actuation lever is then free to rotate upwardly to free the restriction applied to the poppet stem and allow the controlled valve to open.

One of the principal advantages of the triggering mechanism of the present invention is that it is compact and virtually foolproof in construction and is triggerable by the application of a relatively small force.

Another advantage of the present invention is that it can be easily armed or disarmed without requiring specially prepared tools or the like.

Still another advantage of the present invention is that the actuating cables can be removed and replaced at any time without requiring actuation of the valve controlled thereby.

Still another advantage of the present invention is that it may be retained relative to the valve housing so that the release cable pull direction can be suitably chosen to fit a particular application.

Still another advantage of the present invention lies in its rugged structure which enables it to perform satisfactorily even after severe mishandling.

Still other advantages of the present invention will become apparent to those skilled in the art after having read the following disclosure of a preferred embodiment which is illustrated in the several figures of the drawing.

IN THE DRAWING

FIG. 1 is a block diagram of an inflation system including trigger mechanism in accordance with the present invention.

FIG. 2 is a perspective view illustrating the trigger mechanism of the present invention.

FIG. 3 is a cross section of the present invention illustrating the manner in which the device is armed.

FIG. 4 is a cross section of the present invention illustrating the device in its armed condition.

FIG. 5 is a cross section of the present invention illustrating the device in its triggered condition.

DESCRIPTION OF THE PREFERRED EMBODIMENTS

Referring now to FIG. 1 of the drawing, there is shown a block diagram of an inflation system of the type utilized to inflate life rafts, aircraft escape shutes and other inflatable apparatus. In such systems, the inflatable device 2 is connected to a high pressure source of gas 4, which is typically at a pressure of about 3,000 pounds per square inch, through a suitable regulator mechanism having a trigger mechanism 8 for causing actuation thereof, and an aspirating device 10. A preferred form of regulator mechanism is disclosed in copending U.S. patent application Ser. No. 845,742 filed July 29, 1969, now abandoned, and a preferred type of aspirating device is disclosed in copending U.S. patent application number Ser. No. 803,178 filed Feb. 28, 1969, now U.S. Pat. No. 3,591,814.

Since these devices are typically stored for relatively long periods of time without use, it is necessary that a suitable pressure indicator 5 be included to permit one to determine whether the source 4 contains a quantity of gas capable of causing inflation of the device 2 as intended. A preferred form of pressure indicator apparatus is disclosed in the copending U.S. patent application Ser. No. 800,062 filed Feb. 18, 1969, now abandoned. All of the above referenced copending applications are assigned to the assignee of the present invention.

Referring now to FIGS. 2 and 3 of the drawing, there is shown a preferred embodiment of a triggering mechanism in accordance with the present invention. The body 11 includes a circular base portion 12 and a trigger mechanism housing portion 14. The base portion 12 is adapted for being rotatably received in sealing relationship within a portion of a regulator valve housing 16 such as is disclosed in the above-identified copending U.S. patent application Ser. No. 845,742.

A pair of annular grooves 18 and 20 are provided around the periphery of the base portion 12. The groove 18 is for receiving a locking ring 22 which affixes the base 12 to the valve housing 16 but allows rotation therein. In order to provide easy insertion and removal of the lock ring 22, a portion of the upper part of the base 12 is removed at 24. To provide a seal between the base 12 and the valve housing 16, an O-ring 21 is positioned within the annular groove 20 for sealing engaging the inner wall 26 of the valve housing 16. Either in addition to or in place of the seal provided by O-ring 21 the O-ring 27 may be provided on the lower side of the base 12.

A cylindrical passage 28 is provided through the center of the base 12 for receiving the poppet stem 30 of the valve 16. In order to provide a seal between the stem 30 and the base 12, an annular groove 32 and O-ring 34 are provided in the passage 28. A valve actuation lever 36 which is pivoted about the point 38 is provided for engaging the end of the poppet stem 30 to drive it downwardly into its closed position and to maintain the valve 16 closed when the trigger mechanism is armed. The lever 36, however, in its unarmed position, is biased upwardly out of engagement with the stem 30 by a spring means 40 wound about the pivot point 38.

An arming cam 42 which is pivoted about the point 44 is provided in the upper portion of the housing 14 and includes at the camming end thereof a roller bearing 46 for providing frictionless engagement with the upper surface 47 of the actuation lever 36 during the arming operation. Since the upward force on the poppet stem 30 may, in a typical application, be as high as 100 lbs. or more, it is necessary that a certain amount of leverage be provided for camming the lever 36 into its armed position. In order to provide for such leverage, a bore 48 is provided in the end of the arming cam 42 into which a metal rod or key 50 can be inserted. The rod 50 is thus not an integral part of the triggering mechanism and can be removed after the device is armed. This enables a considerable reduction in the required space allotted for the trigger mechanism.

Should there be any occasion to rearm or dearm the device at a later time, any suitable projection can be inserted into the bore 48 for enabling the arming function. In order to maintain the arming cam 42 in the position shown in FIGS. 2 and 4, for example, a spring-loaded ball detent means 52 is provided between the pivot point 44 and the roller 46, which snaps into holes 54 in the side of the housing 14 to secure the lever 42 in its normal position.

The trigger cam 56 is pivoted about a pivot rod 58 and has a roller 60 secured to the lower portion thereof which can be rotated into engagement with the end of lever 36 for locking the lever 36 to maintain it in its armed position. Because of the roller 60, the engagement between the trigger cam 56 and the upper surface of lever 36 is substantially frictionless. In order to prevent the force applied to lever 36 by the stem 30 from accidentally causing the device to be triggered, a slight eccentric offset is provided between the centers of the pivot pin 58 and the axis of the roller 60 when in its locking position as shown in FIG. 4. Counterclockwise rotation of the cam 56 beyond the armed position shown in FIG. 4 of the drawing is prohibited by the engagement of the edge 62 thereof with the lower wall of the housing 14.

In order to enable a release cable 64 to be attached to the trigger cam 56, a notch 66 is provided in the lower edge 62 into which the cable 64 can be positioned to trap the ball 68 on the end thereof between the edge 62 and the roller 60. To limit the clockwise rotation of the trigger cam 56, a stop 70 is provided.

As one of the features tending to make the device foolproof during arming it will be noted by referring to FIGS. 3 and 4 that the maximum clearance between the stop 70 and the cam 56, the roller 60 and the lower wall 63 of the housing 14 are less than the diameter of the ball 68 at the end of cable 64. Thus, once the ball 68 is passed through the opening 72 in the housing 14, there is no way in which it can be forced past the cam 56 so as to become accidentally lodged in the mechanism to the right of the roller 60 to produce possible jamming of the device.

Referring now specifically to FIGS. 3, 4, and 5, the arming and triggering operations will be described in detail. With the device unarmed, the lever 36 is biased into a position adjacent the lever 42 by the spring 40 as shown in dashed lines in FIG. 3. To arm the device a lever rod 50 is inserted into the bore 48 and is used to rotate the cam 42 in the counterclockwise direction. This causes the lever 36 to be cammed into the position shown in FIG. 3 depressing the poppet stem 30 into the off position of the valve 16. As the lever 36 is being cammed into its lower position, the trigger cam 56 is rotated clockwise about the pivot 58 so that the end of the lever 36 clears the roller 60.

Rotation of cam 56 can be accomplished by slight thumb pressure applied to the top and to the right of the pivot point 58. As an alternative, a weak spring means might be provided to cause clockwise rotation of the cam 56 when no load is applied thereto. With the cam 56 in the position shown in FIG. 3 of the drawing, the device is armed by simply pushing the ball end 68 of the cable 64 through the aperture 72 to engage the roller 60 and cause it to be rotated into place over the lever 36 as shown in FIG. 4. Once the cam 56 is rotated into this position, the torque applied to the lever 50 is released and the arming is complete. The arming cam 42 may then be rotated back into its horizontal position until the ball detent 52 snaps into the holes 54 to hold the cam 42 in place.

Should it be desirable to lock the device after arming to insure against accidental triggering during shipment, handling, etc., a safety pin 74 can be inserted through the holes 76 in either side of the housing 14 to prevent rotation of the trigger cam 56. This pin, however, must be removed in order to render the device operable.

Once the pin 74 is removed, the trigger mechanism 10 can be fired by simply pulling on the handle 78 which is attached to the end of cable 64. The resulting force applied to the edge 62 of the cam 56 by the ball end 68 causes the cam 56 to be rotated clockwise freeing the end of the lever 36 which immediately flies upwardly to actuate the valve 16. It will be noted that when the device is triggered, the cable 64 is pulled completely free of the inflating system. Airline crews, for example, are trained to pull a triggering handle, such as the one used on the end of the firing cable, until it is completely free of the device thus ensuring that their job is complete. This is an added safety factor enabling the person causing the device to be inflated to quickly withdraw himself away from the device so as not to be injured as the device inflates.

It should be apparent that the relative dimensions of the various components of the disclosed triggering mechanism can be altered to change the mechanical advantages of the respective components. Thus, the amount of torque required to arm the device or the amount of pull required to trigger the device can be readily predetermined. Furthermore, the configuration of the housing of the individual components of the mechanism may be modified to better suit a particular application. Should it be found more suitable to actuate the device through an inpact action rather than by a pulling action, a triggering handle or lever could easily be affixed to the trigger cam 56 for causing rotation thereof in response to an impact type force applied to the handle, such as with the heel of the hand, for example.

It is contemplated that after having read the above disclosure, these and many other modifications will become apparent to those of skill in the art which do not materially depart from the merits of the invention. It is therefore intended that the scope of the appended claims be interpreted as covering all such modifications as fall within the true spirit and scope of the invention.

What is claimed is:

1. In a system for inflating an inflatable device in accordance with the operation of a trigger means, said system including a source of high pressure gas, an aspirating means and a gas flow regulating means coupling said source to said device, said regulating means having a trigger mechanism for rapidly actuating said regulating means, an improved trigger mechanism comprising:
   a housing;
   lever means pivotally disposed within said housing and engaging said trigger means;
   arming cam means disposed within said housing and engaging said lever means in one position for causing said lever means to displace said trigger means into a predetermined position;
   trigger cam means engaging said lever means in one position to lock said trigger means in said predetermined position; and
   actuator means coupled to said trigger cam means for causing said trigger cam means to move to a position in disengagement with said lever means in response to a predetermined force applied to said actuator means.

2. In a system for inflating an inflatable device as recited in claim 1 wherein said arming cam means includes a roller means engaging said lever means in the one position and providing a substantially frictionless contact therebetween.

3. In a system for inflating an inflatable device as recited in claim 2 wherein said trigger cam means includes a roller means engaging said lever means in the one position to provide a substantially frictionless engagement between said trigger cam means and said lever means.

4. In a system for inflating an inflatable device as recited in claim 1 wherein said actuator means is a cable means having one end thereof attached to a member engaging said trigger cam means for causing said trigger cam means to be moved out of engagement with said lever means in response to a predetermined pull force applied to the other end of said cable means.

5. In a system for inflating an inflatable device as recited in claim 4 wherein said housing includes a circular base portion rotatably mounting said trigger mechanism to said gas flow regulating means.

6. In a system for inflating an inflatable device as recited in claim 1 wherein said arming cam means is pivotally disposed within said housing and includes a roller means engaging said lever means in said one position to provide a substantially frictionless operative engagement therebetween.

7. In a system for inflating an inflatable device as recited in claim 6 wherein said trigger cam means is pivotally disposed within said housing and includes a roller means engaging said lever means in said one position to provide a substantially frictionless operative engagement therebetween.

8. In a system for inflating an inflatable device including a source of high pressure gas, an aspirating means and a gas flow regulating means coupling said source to said device, said regulating means having an actuating element coupled to a trigger mechanism for rapidly actuating said regulating means, an improved trigger mechanism comprising:
   a housing;
   lever means pivotally connected to said housing and movable between an armed position and a released position, said actuating element engaging said lever means and biasing said lever means into said released position;
   arming cam means movably supported within said housing and engaging said lever means in one position for moving said lever means from said released position to said armed position against the force of the bias;
   trigger cam means movably supported within said housing and, in one position, engaging and locking said lever means in said armed position; and
   trigger actuator means coupled to said trigger cam means and causing said trigger cam means to disengage and unlock said lever means in response to a force applied thereto, whereby said lever means will move from said armed position to said released position under the bias of said actuating element and thereby cause gas to flow into said device.

9. In a system for inflating an inflatable device as recited in claim 8 wherein said arming cam means is pivotally supported within said housing and rotatable between a normal position and said one position constituting an arming position.

10. In a system for inflating an inflatable device as recited in claim 9 wherein said trigger cam means is pivotally supported with said housing and rotatable between an unlocking position and said one position constituting a locking position.

11. In a system for inflating an inflatable device as recited in claim 10 wherein said trigger actuator means is a cable means having one end thereof attached to an element engaging said trigger cam means for causing said trigger cam means to be rotated out of engagement with said lever means in response to a predetermined pull force applied to the other end of said cable means.

12. In a system for inflating an inflatable device as recited in claim 11 and including a spring biasing means biasing said lever means into said released position when said trigger mechanism is unarmed.

* * * * *